US008953997B2

(12) United States Patent
Van Vliembergen et al.

(10) Patent No.: US 8,953,997 B2
(45) Date of Patent: Feb. 10, 2015

(54) PRINT SYSTEM AND METHOD FOR MONITORING PRINT JOBS

(75) Inventors: Eduardus J. W. Van Vliembergen, Venlo (NL); Edward C. Bosma, Venlo (NL)

(73) Assignee: OCE-Technologies B.V., Venlo (NL)

( * ) Notice: Subject to any disclaimer, the term of this patent is extended or adjusted under 35 U.S.C. 154(b) by 1844 days.

(21) Appl. No.: 10/834,035

(22) Filed: Apr. 29, 2004

(65) Prior Publication Data

US 2004/0218197 A1    Nov. 4, 2004

(30) Foreign Application Priority Data

May 2, 2003 (NL) ...................................... 1023326

(51) Int. Cl.
*G03G 15/00*    (2006.01)

(52) U.S. Cl.
USPC .............................. 399/391; 399/81; 399/283

(58) Field of Classification Search
USPC ................ 399/391, 81, 393; 700/17, 83, 100; 345/440, 440.2; 710/6
See application file for complete search history.

(56) References Cited

U.S. PATENT DOCUMENTS

| | | | | |
|---|---|---|---|---|
| 5,036,361 A | * | 7/1991 | Filion et al. ...................... | 399/81 |
| 5,081,595 A | | 1/1992 | Moreno et al. | |
| 5,357,329 A | * | 10/1994 | Ariyama et al. ................. | 399/16 |
| 5,621,541 A | * | 4/1997 | Sakai et al. .................... | 358/407 |
| 5,923,942 A | | 7/1999 | Nuggehalli et al. | |
| 6,058,277 A | * | 5/2000 | Streefkerk et al. .............. | 399/81 |
| 6,421,509 B1 | * | 7/2002 | Nomura et al. ................. | 399/81 |
| 6,504,556 B1 | | 1/2003 | Myers | |
| 7,120,373 B2 | * | 10/2006 | Kushida et al. ................. | 399/81 |
| 2002/0135792 A1 | | 9/2002 | Sommer et al. | |

FOREIGN PATENT DOCUMENTS

| | | | | |
|---|---|---|---|---|
| EP | 1152591 A1 | | 4/2001 | |
| EP | 1244054 A1 | * | 9/2002 | ............. G06K 15/00 |
| JP | 11-157174 | | 6/1999 | |
| JP | 2002-149388 | | 5/2002 | |
| JP | 2002-342046 | | 11/2002 | |

* cited by examiner

*Primary Examiner* — Matthew G Marini
(74) *Attorney, Agent, or Firm* — Birch, Stewart, Kolasch & Birch, LLP

(57) ABSTRACT

A print system including a print engine for printing a receiving material, a plurality of holders, each for holding one type of receiving material and delivering said material for printing to the print engine, a receiver for receiving jobs, a job being an order containing printing information on one or more types of receiving material specified in said order, and a control system for planning jobs, wherein the jobs are placed in a print queue in a sequence of finishing, and the control system is adapted to establish: a) the types of receiving material specified for a set of different jobs in the print queue, b) a shortage of a type of receiving material if there is insufficient receiving material present in the plurality of holders in order to finish a job of the said set, c) an indication of the time when said type of receiving material is no longer present in the plurality of holders, and wherein the print system further comprises a unit for displaying an image adapted to show an operator of the print system the items established under b) and c) by the control system.

8 Claims, 7 Drawing Sheets

PRINT SYSTEM AND METHOD FOR MONITORING PRINT JOBS

This non-provisional application claims priority under 35 U.S.C. §119(a) on Patent Application No. 1023326 filed in The Netherlands on May 2, 2003, which is herein incorporated by reference.

BACKGROUND OF THE INVENTION

The present invention relates to a print system comprising a print engine for printing a receiving material, a plurality of holders, each for holding one type of receiving material and delivering this material to the print engine, a receiver for receiving jobs, a job being an order comprising printing information on one or more types of receiving material specified in said order, and a control system for planning jobs, by placing the jobs in a print queue in a sequence of finishing.

A print system of this kind is known from U.S. Pat. No. 5,081,595. A job is programmed in a job program mode, a job ticket being displayed on a monitor screen. After the job has been programmed, it is moved from a memory to a print queue. The sequence of jobs in this queue is determined by priority allocated to each of the jobs and the time of arrival of the job in the queue. The print queue itself, at least the names of the jobs and the associated number, and a number of variables, such as the number of documents required and the type of receiving material required, are displayed on the screen if the operator of the print system so requests.

The print system at all times knows what type of receiving material is situated in each of the holders and also the different types of receiving material required for finishing a job in the print queue. In this way the system can always check whether the correct receiving material has been loaded to enable printing to start. If the correct receiving material is loaded in the holders, the job will be printed. If not, then the system will indicate to the operator what type of receiving material he should insert in one or more of the holders. If the receiving material required for the current job is present in sufficient quantity and there are one or more holders left for loading different receiving material, the operator can check whether the receiving material for the next job in the print queue is present in the holders. Thus before this next job is actually started, he can insert any receiving material not present for that job, so that the job can immediately start when the current job is completely finished.

A disadvantage of this known system is that the operator can have information concerning a following job only if the receiving material required for the current job is already loaded in the holders. This very considerably limits the operator's overview so that he feels as if he has little or no control over the print system. Another disadvantage is that a receiving material loaded must at all times be specified by the operator, even if the system has already indicated that a specific type of receiving material should be loaded. For example, if the system indicates that a receiving material of the type "A3, white, 160 g, relief" must be loaded, then after he has done this the operator must select these four settings in order to indicate that he has loaded the receiving material of the required type. This takes relatively considerable time and the fact that all the material properties have to be re-selected time and time again means that the operator is prone to making mistakes.

A print system of this kind is also known from EP 1 152 591. This system also has the disadvantage that the operator only receives information concerning the required receiving material for one job. He will have to insert a possibly requested type of receiving material before the system will give any information concerning a following job.

With respect to the previously described print system, this system has the advantage that the operator no longer has to specify an inserted type of receiving material, i.e. he can input all the characterising properties one by one when the system has requested a specific type of receiving material and the operator has inserted that type of material in response thereto. A confirmation of the fact that he has inserted the requested type of receiving material is sufficient. This confirmation may, for example be actuation of the "Start" button or closing the holder after the receiving material has been inserted. The disadvantage of this known system is that a complete specification of an inserted type of receiving material is always necessary if the operator decides to insert a receiving material in one of the holders without the system having reported the need for that type of receiving material.

A print system which obviates the latter problem is known from U.S. Pat. No. 5,923,942. A receiving material holder in this system has a setting means on which there are pre-programmed a number of types of receiving materials which are frequently selected. If an operator of the system inserts one of these types of receiving material in the holder, he only has to set the setting means to the inserted type of receiving material. The system then knows of itself what type of receiving material has been inserted and the operator need not specify this in all its properties. In addition to the many types of receiving material used, he can use the known setting means also to select a non-predefined type by setting the said means to "Other". This possibility is provided because it may happen that a different type of receiving material is loaded compared with one of the standard types. If the setting means is set to "Other" a dialogue with the operator follows so that he can define the inserted paper type.

A disadvantage of this known system is that the selection of "Other" will have to be made relatively frequently in an environment in which very many different types of paper are used, for example a central reproduction department of a large company or a job printer. As a result, the advantage of pre-defined types of receiving materials will be relatively insignificant. Another solution might be to offer many more of such predefined types of receiving materials on the setting means, but this in turn has the disadvantage that the means becomes less readily overviewed.

From U.S. Pat. No. 6,504,556 a print system is known in which, starting from a list of predefined receiving materials, an operator can define an inserted type of receiving material by means of a drag-and-drop operation. The list includes a set of icons, each icon representing one type of receiving material. This list is in fact a library, which contains a large enumeration of receiving materials. If the operator wishes to insert one type of receiving material that is not yet included in the library, then he can make a new icon and define the associated type of receiving material.

A disadvantage of this known print system is that the list becomes cumbersome in environments where very many types of receiving material are used. To search for the correct icon in the list may then take so much time that the gain in time obtained by no longer having to input the separate properties of the receiving material is completely lost.

SUMMARY OF THE INVENTION

The object of the present invention is to provide a print system that can be used efficiently and which requires a minimum of operator control time in order to complete jobs requested by the system. Another object of the present invention is to provide a method of using the print system.

For this purpose, a print system is provided wherein the control system is further adapted to establish (a) the types of receiving material required to finish a set containing different jobs in the print queue, (b) a shortage of one type of receiving material if there is an insufficient amount of the said material present in the plurality of holders in order to finish the jobs of the said set, and (c) an indication of the time at which this type of receiving material is no longer present in the plurality of holders, the print system further including a unit to display an image adapted to display to an operator of the print system the items established under (b) and (c) by the control system.

In the print system according to the present invention, the control system first looks at a number of jobs, for example a first number of jobs in the print queue, and establishes what types of receiving material are required to finish all those jobs. The system then determines whether there is a sufficiently large quantity of each of these types of receiving material present in the total number of holders. If a specific type of receiving material required has not been loaded at all in one of the holders, or if it has been loaded but there is too little present in order to completely finish the jobs, then the control system establishes that there is a shortage of that type of receiving material. The control system also establishes an indication of a time at which this type of receiving material will no longer be present. If the receiving material is completely absent from one of the holders, then said time is, for example, equal to the time when the shortage is established (="immediately" or "now" for the system operator). It would also be possible to indicate the time at which the material will first be required to finish a job. Only then is the absence of said material actually perceptible and hence relevant for the print system itself. If the material is present in one or more the holders, but insufficient in order completely to finish the jobs, the control system can calculate when the last sheet will be used. Immediately thereafter this type of material will no longer be present in the plurality of holders. Establishing this time is important, because the print system will come to a halt only at this time. Prior to the receiving material being used up, a shortage thereof is in fact irrelevant because the print system can continue its jobs undisturbed. By displaying an image to the operator, for example using a monitor screen, to show that there is a shortage of one or more receiving materials for such a set of jobs, and also when this shortage will be perceptible, the operator can see at a glance a fairly long time in advance when he must eliminate which bottlenecks in order to enable the system to finish the jobs undisturbed. In this way, the operator can plan his work on the print system, for example filling the holders, more satisfactorily, so that he requires less time to operate the system and also he has better control of the print system. Let us assume, for example, that the operator receives the following information from the system: the current job, which takes another 10 minutes, the next job, for which 2 minutes are required, and the next job after that, which will take 45 minutes, can be finished undisturbed. For job no. 4 in the print queue, however, green cover material must be loaded if this job takes 15 minutes (hence over 72 minutes). The operator can thus now leave the system in order to do other work and he knows that the next problem will not be perceptible until 72 minutes have elapsed.

In the system as known, for example, from U.S. Pat. No. 5,081,595, the operator knows at that time that jobs 1 and 2 at most can be finished undisturbed and for this purpose he must already traverse two screens on the monitor of the user interface. The operator must thus, at the latest, return to the print system after 12 minutes if he wishes, with certainty, to prevent the print system from interrupting printing. After these 12 minutes he can check whether job no. 3 can be finished. This visit to the system can be obviated by using the print system according to the present invention.

The principle of the present invention is based on the recognition that an operator of the print system, particularly a system disposed centrally and intended in principle to be operated by a specified person, should be able to see at a glance what need there is for materials, or more generally, conditions for finishing the jobs which have been planned for a relatively long time, so that he knows when and what limitations must be eliminated so that the system can continue printing undisturbed, at least for the said time. In these conditions it may occur that the operator wants to know whether the conditions (for example paper, staples, finishing materials, output space, and so on) for the present job and a number of jobs following thereon have been met so that he knows how long he can leave the print system without the system having to interrupt the finishing of these jobs. It is also possible that an operator may be interested in a different set of jobs. The present invention is therefore not restricted to establishing facts relating to a set of jobs at the head of the print queue.

It should also be clear that the control system for the print system according to the present invention is limited to one designated processor but this may be presently distributed over the system. Nor does the print system itself need to be a physically cohesive set of components but can, for example, consist of a terminal for generating a job, a server at a different location to receive the job, and a controller which includes the control system and is disposed in the vicinity of the print engine, which engine is located in a separate room, for example because of noise or other environmental requirements. It is important that the control system should in every case have available data indicating the type of receiving material and the quantity in each of the holders, and at least those holders which are capable of delivering the receiving materials to the print engine, if such materials are present. Holders for which the control system cannot establish what type of receiving material is situated therein, may be present in the print system but do not belong to the holders which are usable according to the present invention.

In one embodiment, the image is also adapted to display the item (a) established by the control system, i.e. the types of receiving material required to completely finish the set of jobs. In this embodiment, the operator can see in the image not only what bottlenecks he has to eliminate at what time, but can also see what materials specified in the jobs really are present in sufficient quantity. It has surprisingly been found that this information, which, in principle, appears to be superfluous, in combination with the information already displayed, greatly enhances the feeling of control that the operator has over the print system. Apparently a complete survey of all the materials specified for the jobs, and indicating in the same survey which materials are deficient and when that will be perceptible, is an important improvement over the known print systems. Apparently a feeling of good control occurs not only when negative information is received concerning the print system (when something goes wrong) but also whenever positive information (what is going right) is given concerning the system.

In another embodiment, wherein the image includes a matrix which in a first dimension reproduces the set of jobs and in a second dimension the corresponding types of receiving material, the matrix indicates what types of receiving material are specified for each of the jobs in the set and whether there is a shortage of each of these receiving materials. Above the matrix, for example in a row from left to right, the set of jobs is shown, each job corresponding to one column of the matrix. On the left of the matrix, each of the types of receiving material can be given in a column from top to bottom as required for finishing the set of jobs. Each type of receiving material in this specific embodiment corresponds to one row of the matrix.

In the matrix formed in this way, it is a simple matter to indicate, for example by the use of colors, grey values, shading, codes, and so on, what type of receiving material is necessary for which job, or whether there is a shortage, and if so, when the receiving material will be used up. In this way a very comprehensive image is created in which the operator can rapidly have an overview of anything going wrong or not going wrong in the coming jobs so that he can efficiently divide up his operating time.

In a further embodiment, a space in the first dimension corresponds to an interval of time. In this embodiment the time is shown by a space. This has the advantage that an indication of the time is given which corresponds to the natural feeling that time and space are coupled. By means of a time indication according to this embodiment, an operator has been found to absorb the information from the image much more rapidly. Thus a job for which more time is required in order to finish the same will occupy a longer part of the corresponding row. In this way an operator has a very good overview of the planned jobs.

In one embodiment of the present invention, the set comprises the jobs which are planned for finishing by the print system within a predetermined time. In this embodiment, for example, with respect to the jobs planned for the next hour, a check is made as to what receiving materials will be required for these jobs and whether there is a shortage of these receiving materials. This embodiment would appear to be particularly suitable for an operator to keep the print system running. The length of time does not form any part of the present invention and can in principle be freely selected according to the operator's wishes. A longer time will often be attractive when the print system has a large quantity of holders and is very reliable, i.e. hardly has any disturbances. This gives the operator the possibility of supplying the system with the required receiving material for a long time in advance, so that he can then carry out other activities undisturbed.

In another embodiment, the image is such that for a displayed type of receiving material an indication is given which corresponds to the quantity of the receiving material required to finish at least a part of the job. In this embodiment, the operator not only receives information concerning whether a type of receiving material is or is not present in sufficient quantity, but also an indication of what quantity of receiving material is required to finish at least a part of a job. In one embodiment, for example, with respect to a receiving material for which a shortage is indicated, it shows how much receiving material will be required in order to finish the job after this receiving material has been used up. In this way the operator not only knows what receiving material he must insert for what period of time to enable a job to be continued undisturbed, but also knows how much of this material he must insert so that the job can be completely finished.

In another embodiment, the image is such that as an addition to the types of receiving materials specified for the set of jobs, each type of receiving material is shown which is defined for one or more of the holders but which type is not specified for the set of jobs. In this embodiment, in addition to the types of receiving materials required, a display is also given of those types which are present in the plurality of holders but which are not specified for use for one or more of the jobs. In principle it appears irrelevant to display these types of receiving material but in this way, the operator has a very good overview of the materials loaded in the holders and are usable, in principle, for printing. This improves the feeling of control that the operator has.

In another embodiment, the image is such that in addition to types of receiving material other conditions are shown which are required for finishing jobs. In addition to one or more receiving materials, there are often other conditions required for finishing jobs. Examples are binding means such as staples or glued edges and also output space in a finisher of the print system. For example, as soon as there is no longer any output space then the printing of documents will have to be interrupted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will now be explained further with reference to the accompanying drawings, wherein.

DETAILED DESCRIPTION OF THE INVENTION

Figure 1:
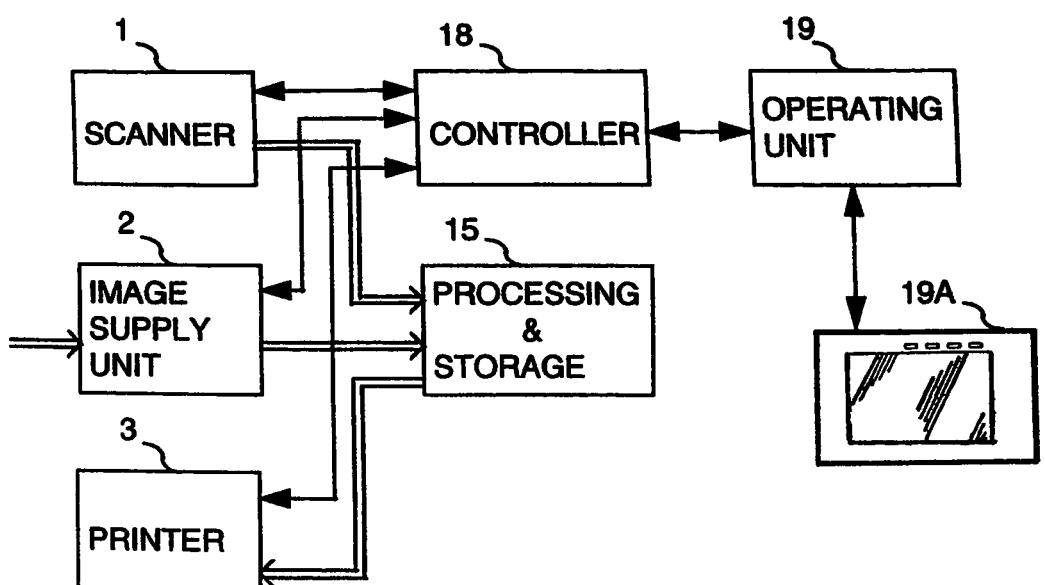
FIG. 1 shows the general arrangement of the print system.

FIG. 1 shows the general arrangement of a print system. This system comprises a scanner 1 for opto-electrical scanning of a document and delivering digital image information corresponding thereto, a feeder 2 for feeding image information from an external source to the system and a print engine 3 for printing digital image information on a receiving material. Both the scanner 1 and the feeder unit 2 are connected to a device 15 for processing and intermediate storage of image information, which in turn, is connected to the print engine 3. The scanner 1, feeder unit 2, device 15 and print engine 3 are connected to a central control 18, which is also connected to an operator control unit 19 provided with an operator control panel 19A with operator control elements and a display element, in this case an LCD screen in the form of a touch screen for use by an operator at the print system. This display unit is developed further in FIG. 3.

Figure 2:
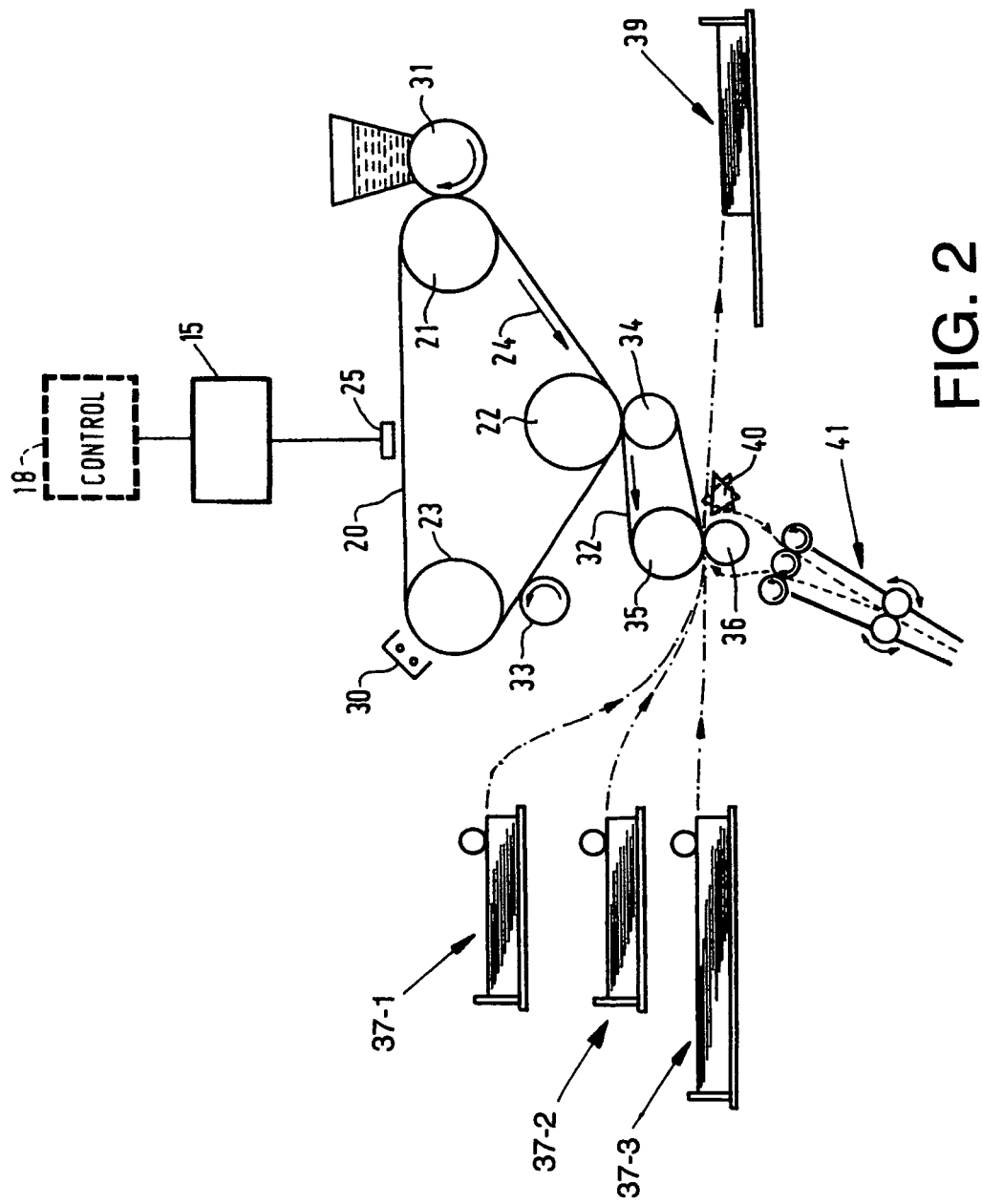
FIG. 2 shows important parts of the print system.

FIG. 2 shows the important parts of the print system. The illustration shows important parts of the print engine 3, a number of holders 37 for holding sheets of receiving material and delivering said sheets to the print engine, and an output tray 39 for collecting printed sheets. The various parts are controlled by the central control unit 18, directly or through the agency of sub-control modules.

The print engine 3 is provided with an endless photoconductive belt 20, which is advanced in the direction of arrow 24 at a uniform speed by means of drive and guide rollers 21, 22 and 23 respectively. By means of the processed data fed from device 15, an LED array 25 is so controlled that the photoconductive belt 20, after being electrostatically charged by a corona device 30, is exposed image-wise line by line.

The latent charge image forming on the belt 20 as a result of the exposure is developed by means of a magnetic brush device 31 with toner powder to form a toner image which is then brought into contact under pressure with an endless intermediate medium belt 32 in a first transfer zone, said belt being made from or being covered with an elastic and heat-resistant material, for example silicone rubber. In these conditions, the toner image is transferred by adhesion forces from the belt 20 to the belt 32. After this image transfer, any remaining toner powder residues are removed from the photoconductive belt 20 by means of a cleaning device 33, whereafter the belt 20 is ready for re-use.

The intermediate medium belt 32 is trained over drive and guide rollers 34, 35, the intermediate medium belt 32 being heated to a temperature above the softening temperature of the toner powder, for example by means of a infra-red emitter disposed inside roller 35. While the belt 32 with the toner image thereon is advanced, said toner image becomes tacky as a result of the heating. In a second transfer zone between the belt 32 and a pressure roller 36, the tacky toner image is transferred under the influence of pressure and at the same fixed on a sheet of receiving material fed from the holders 37-1, 37-2 of 37-3. The resulting printed sheet is finally deposited in an output tray 39. This forms part of a finisher (not shown in detail), which also has one or more following output trays and units for after-treatment of printed sets of receiving materials, for example by stapling them or providing them with a cover. Another possibility is that a printed sheet is fed by a deflector element 40 (placed in the position indicated by broken lines) to an inverting device 41. In this inverting device 41 the sheet is turned over, whereafter it is again fed to the second transfer zone between the belt 32 and the pressure roller 36, where it can be printed with a powder image on the other side in the transfer zone and then deposited in the output tray 39.

The drawing shows three holders 37-1, 37-2 and 37-3, the first two being arranged for copy sheets of A4 format and the last for copy sheets of A3 format. When sheets are loaded into one of the holders, for example A4, white, plain paper in 37-1, the control unit receives details of the type of receiving material in that holder. In this way, the type of receiving material is defined for that holder. The control system can then address a holder when the type of material in that holder, at least according to the definition, corresponds to the material as required to finish a job. If the type of material is also defined for one of the other holders, then it would also be possible to address one of these holders, for example if the material is exhausted in holder 37-1. In this embodiment a holder retains its definition even if the material in the holder is used up.

If no type of material has been defined for a holder, or if the definition has been removed, that holder cannot be addressed for delivering sheets of receiving material to the print engine. Of course, the number of holders could also be other than three, and holders can be used for other formats or orientations of copy sheets.

Figure 3:
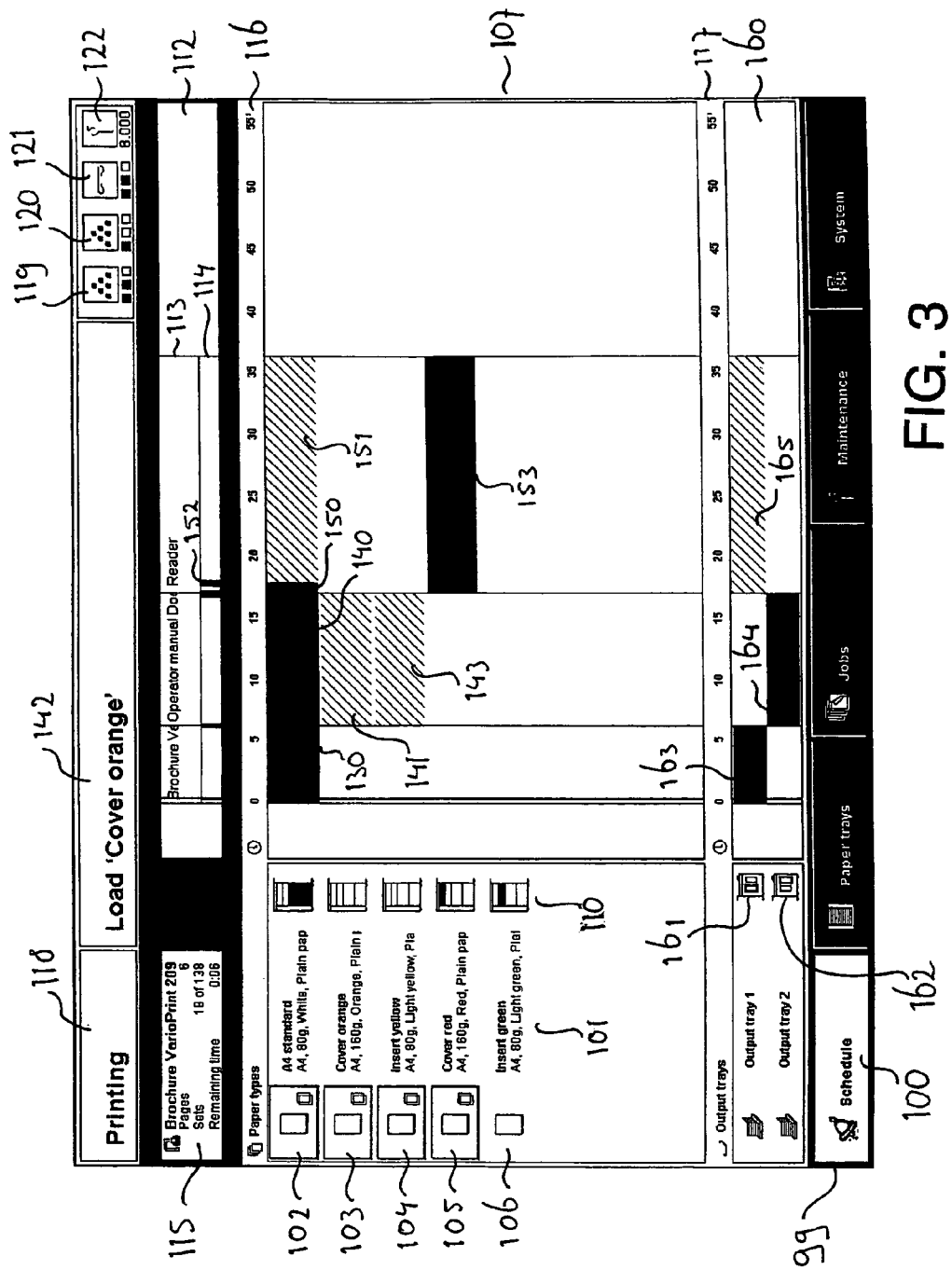
FIG. 3 shows an image that can be displayed on the monitor screen of a display unit of the print system.

FIG. 3 shows an image displayed on the screen of display unit 19. A display unit of this kind is also referred to as a user interface. The image is part of the scheduler mode as indicated by reference 100 on toolbar 99.

In this mode, a column 101 is shown on the left, and a series of paper types beneath one another. The first paper type mentioned is A4 standard (A4, 80 g, white, plain paper) which is indicated as such in this column including its most important properties. The last type of paper indicated is "green insert sheet". On the left of these receiving material types, buttons 102, 103, 104, 105 and 106 are shown. With regard to the buttons 102 to 105, it is indicated that these can be operated by highlighting the paper logo. Within the frame it is also indicated by means of the small double paper logo in the right hand bottom corner that these paper types are necessary for performing planned jobs. The type "green insert sheet" is not planned at the moment. The reason that this type of paper is nevertheless indicated is that this type is defined for one of the holders of the print system.

Column 110 is situated on the right of column of 101. For each paper type there is a diagrammatic indication of the holder module of the print system, in this case a module with four holders situated one above the other. In each module the holder is indicated in which the corresponding paper type is located. The type "A4 standard" is located in the bottom two holders. The types "orange cover" (corresponding to button 103) and "yellow insert sheet" (corresponding to button 104) are not present in any of the holders. The type "red cover" is present in the top holder and the type "green insert sheet" is present in the second holder from the top.

Display 112 shows what jobs are planned for the next 55 minutes. In this way jobs (112) and paper types (101) together form a matrix 107. Sub-bar 113 shows the job names, in this case "Brochure Varioprint 209", "Operator manual Doc-Works" and "reader". Sub-bar 114 gives the job limits and the times at which a limitation occurs in the system so that the system must interrupt printing. The corresponding time can be read off in time bars 116 and 117.

The job being processed at this moment, namely "Brochure Varioprint 209", is also displayed in element 115. Here there is also additional information regarding the job, such as the number of pages per document (6), the number of documents still to be printed (18), the total number of documents for printing (138) and the time still required to finish the job (6 minutes). This time can also be read off by combining the information from sub-bars 113 and 114 with the information from 116.

The image indicates that the system is engaged in printing (unit 118, status "Printing"). Units 119 and 120 indicate to what extent the corresponding toner supply systems, one for black toner and one for colored toner, are still filled with toner (two-thirds and one-third respectively). Unit 121 indicates that there is still a supply of approximately two-thirds of the maximum number of staples that can be loaded in the system. Unit 122 indicates that a maintenance operation is necessary over 8,000 prints.

Matrix 107 forms the heart of the image. This part of the image indicates what types of receiving material are defined for the jobs of row 112 and also whether there is sufficient receiving material present to completely finish the job. Thus with regard to the current job ("Brochure Variopoint 209") it is indicated that paper of the A4 standard type is required for this purpose. This is indicated by image unit 103 which is at the point of intersection of said type of receiving material and the said job. The color of this image unit, for example green, shown as complete blackening in this figure, indicates that there is sufficient paper present to finish the job. Paper of the A4 standard type is also required to finish the next job "Operator Manual DocWorks") and this is indicated by image unit 140. This unit starts at the same time as the beginning of the job (over approximately 6 minutes) and ends at the end of the job (over approximately 17 minutes). The entire unit is green, so that there is a sufficient amount of this paper type present in the holders for this job also to be finished. This job also requires paper of the "orange cover" type, indicated by image unit 141. This unit also starts and ends at the job limits.

Figure 4:
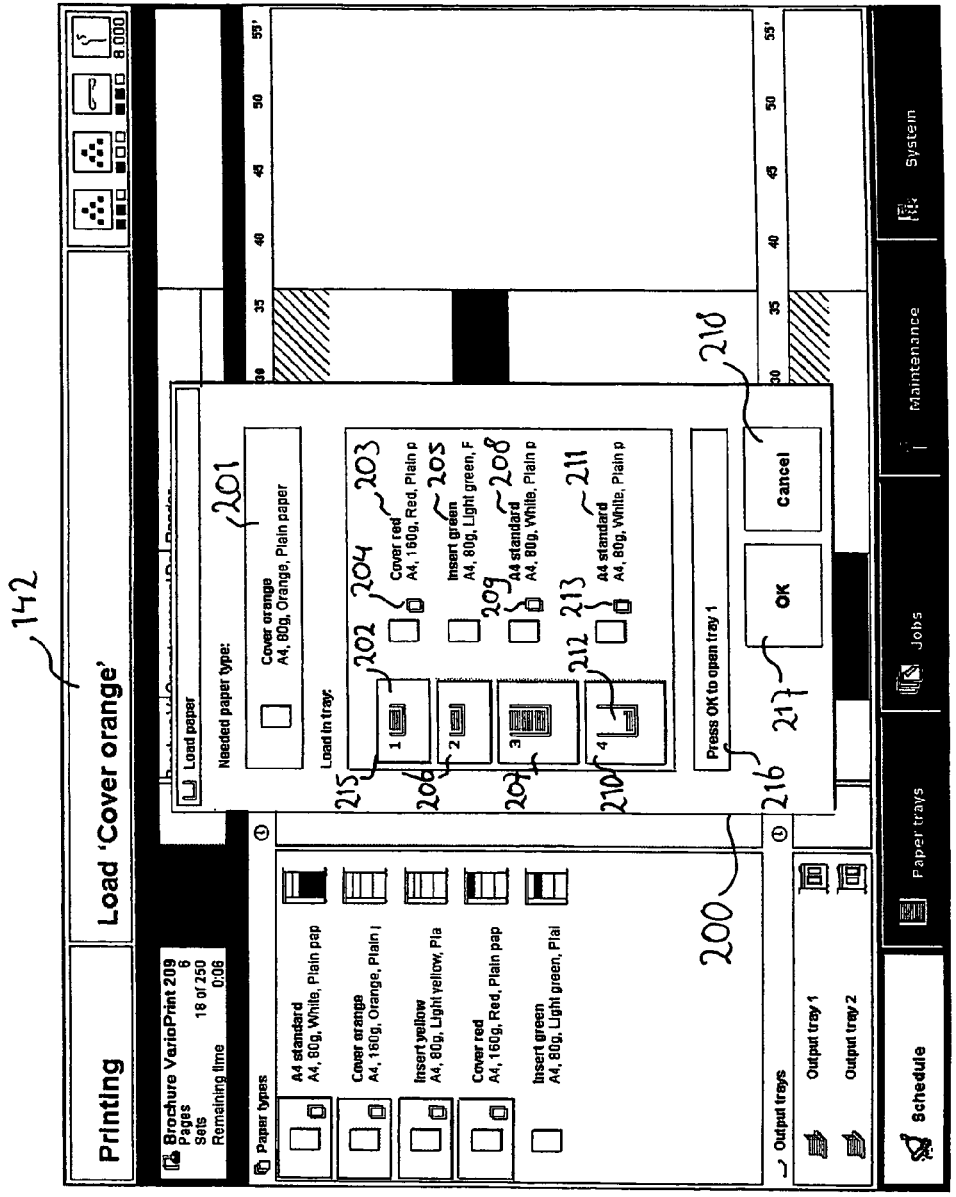
FIG. 4 shows the same image as FIG. 3 but in this case with a dialogue window at the top.

Since this paper is not present in the holders there is a shortage of this material. This is indicated by a color, namely orange (shown as hatching in this figure). This color is a symbol of a shortage which will not be actually noticeable for some time as "the absence" of said material so that the job must be interrupted. To obviate this, the operator of the system must therefore load this paper before the start of the job, and this is indicated by a thick orange stripe in sub-bar 114. Since this is the first type of material of which a shortage will be perceptible, it is important that this type of paper should be the first to be loaded by the operator. To make this clear to the operator, image unit 142 indicates that the operator must load this paper. To load the paper, the operator presses button 103, whereafter a dialogue window as shown in FIG. 4 appears. This example will not be discussed further here.

Paper of the "yellow insert sheet" type is also required for this job but is not loaded in one or more of the holders. Image unit 143 indicates this by means of an orange color. Sub-bar 114 indicates the time when the shortage of this paper becomes perceptible.

The third job "Reader" also requires paper of the A4 standard type. This paper will be necessary at the start of the job and is indicated by the green image unit 150. Image unit 151 also makes clear that this paper will run out after approximately one minute of printing of this job. This time is also indicated in sub-bar 114 by the thick orange stripe 152. The system operator thus has a clear overview to show that he must load paper of the A4 standard type before approximately 17 minutes elapse, in order to prevent job number 3 from being interrupted. Paper of the "red cover" type is also required for this third job. This is indicated by means of unit 153. The color green indicates that there is a sufficient amount of this paper loaded to finish the job.

In the event of an acute problem, for example if the A4 standard paper is no longer present at this time, so that printing by the print system must be interrupted at this precise moment, this is preferably indicated by the red colors of the corresponding image unit. This color is striking and is generally associated with an acute interruption of a continuous process.

Bar 160 relates to the output trays of the print system, which in this case comprises two trays, namely output tray 1 and output tray 2. These are indicated by icons 161 and 162. Image unit 163, which is situated at the point of intersection of the output tray 1 and job 1, indicates that the documents of job 1 have been deposited in the first tray. The green color indicates that there is sufficient room in this tray to collect all the documents required to be formed. Image unit 164 indicates that the documents of 2 are deposited in output tray 2. There is sufficient room here as well. Image unit 3 indicates that the documents of job 3 are planned to be deposited in output tray 1. The orange color of this image unit indicates that there is no longer any space in this tray at the start of this job. The operator therefore sees that he must (at least partially) empty output tray 1 in order to prevent the third job from not starting because of a lack of space in the planned output tray. In one embodiment, an output tray is used only to deposit the documents associated with one job, at maximum. Therefore, after the first job has been completed the corresponding output tray must be emptied before documents of the next job can be deposited in that tray, even if there is still sufficient room to deposit documents of the next job in the same tray. The advantage of this embodiment is that documents of different jobs will not be mixed up.

In a variant of the above-described embodiment, the image units 130, 140, 141, 143, 150, 151 and 153 give an indication as to the quantities of receiving material to which each of the units corresponds. This could be indicated, for example, by using small vertical lines in the units, the space between two lines corresponding to a specific number of sheets of receiving material. Typically, a quantity of 500 sheets is indicated because this is equivalent to the contents of conventional paper packages. This is convenient particularly for image units 141, 143 and 151. The operator thus sees at a glance how many packs of paper he must insert to meet the shortage. Thus unit 141 in this example corresponds to less than 50 sheets (1 space, hence one pack to be replenished), unit 143 corresponds to 100 sheets (1 space, hence one pack to be replenished) and unit 151 corresponds to approximately to 2,000 sheets (4 spaces, hence 4 packs to replenished). Of course other quantities can be selected for the space between the lines, and other methods can be selected to indicate the quantity of receiving material corresponding to an image unit in the matrix.

FIG. 4 shows the same image as FIG. 3 but now with the dialogue window 200 at the top. This window is displayed in response to the operator indicating that he wishes to perform the requested operation "Load Cover orange" as indicated in FIG. 3.

Image unit 201 also indicates what the required paper type is. This diagrammatically indicates what holders the print system comprises, namely holders 1, 2, 3 and 4 indicated by the icons 202, 206, 207 and 210. The icons also diagrammatically give an indication of the size of the holder. Holders 1 and 2 are small, holders 3 and 4 are large. The icons also indicate the extent to which the holders are filled: holders 1, 2 and 3 are approximately full, whereas holder 4 is almost empty (see element 212). On the right of the icons it is indicated which type of receiving material is defined for each of the holders (the system assuming that the defined material corresponds to the material actually present). Thus image unit 203 indicates in text that paper of the "Red cover" type (A4, 160 g, red, plain paper) is defined for holder 1. It is apparent from icon 202 that this holder is almost full. Image unit 204 indicates that this paper is planned for one or more of the jobs which should be finished during the next hour (see bar 112 in FIG. 3).

Image unit 205 indicates what type of receiving material is defined for holder 2, namely "green insert sheet". Since there is no sub-image corresponding to unit 204 for this paper type, the operator sees that this paper is not required to finish one of the planned jobs.

Image unit 208 indicates that paper of the A4 standard type is defined for holder 3. Icon 207 indicates that holder 3 is almost full and image unit 209 indicates that this type of paper is required to finish one or more of the planned jobs.

Image unit 211 indicates what type of receiving material is defined for holder 4, which is almost empty (see 212). Unit 213 indicates that this type of paper is required to finish one or more of the jobs planned for the next hour.

The operator can select a holder to receive the required paper. Since holder 2 contains a material that is not required for one of the planned jobs, the operator could select that holder. However, holder 4 is probably not necessary to finish one of the jobs either, because holder 3 is completely full of the same paper type. Holder 1 could also be selected. Probably the paper in this holder is required for one of the planned jobs, but because this paper is only required for job 3, emptying of the holder will not result in interruption of jobs 1 and 2. In this case the operator has selected holder 1 by actuating icon 202. The selection of that holder is indicated by the thickening 215 and the text in the image unit 216. If the operator now presses button 217, the choice of holder 1 is confirmed. Confirmation of the choice by the use of the button 217 results in holder 1 being opened so that the operator can insert the required paper, i.e., orange covers. After the paper has been inserted, the holder is closed. Closing this holder serves as confirmation that the required paper type has been inserted. The dialogue window 200 disappears from the screen and image unit 141 will change to a green surface. In this way all the limitations resulting in the interruption of a job can be eliminated. The dialogue window can also be closed without changing a definition for a holder. For this purpose the operator can press button 218 ("Cancel").

Figure 5:
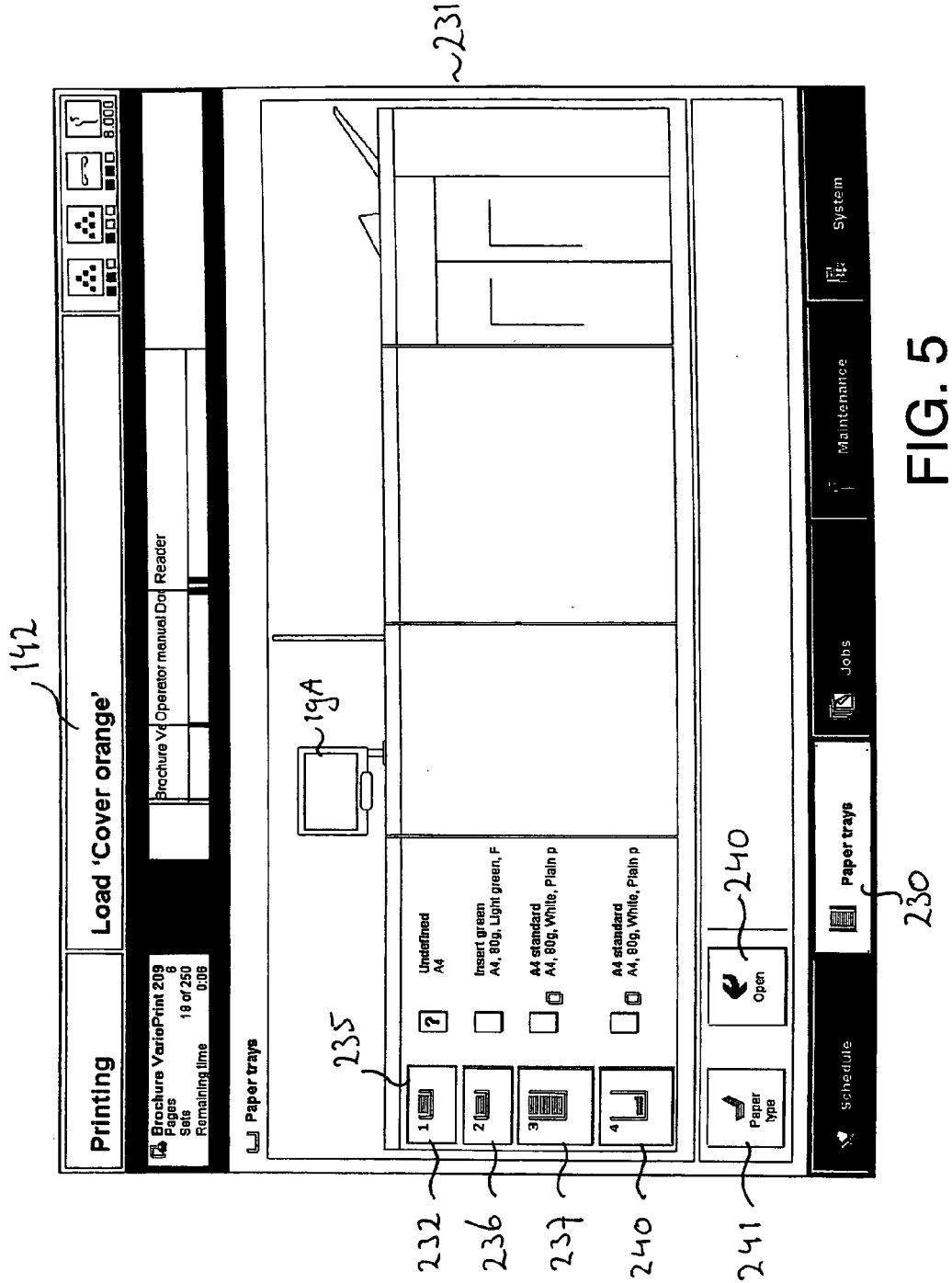
FIG. 5 shows another mode of the print system on the display unit.

FIG. 5 shows another mode of the print system via the display unit. This is the paper trays mode, which is indicated by image unit 230. This mode is used, for example, by an operator for placing paper in one of the holders without instructions, this being given in the scheduler mode. This might be the case, for example, if the operator wishes to introduce paper of a type which on average is frequently required or, for example, to correct errors such as a definition of a holder which does not correspond to the type of receiving material situated in that holder.

Figure 6:
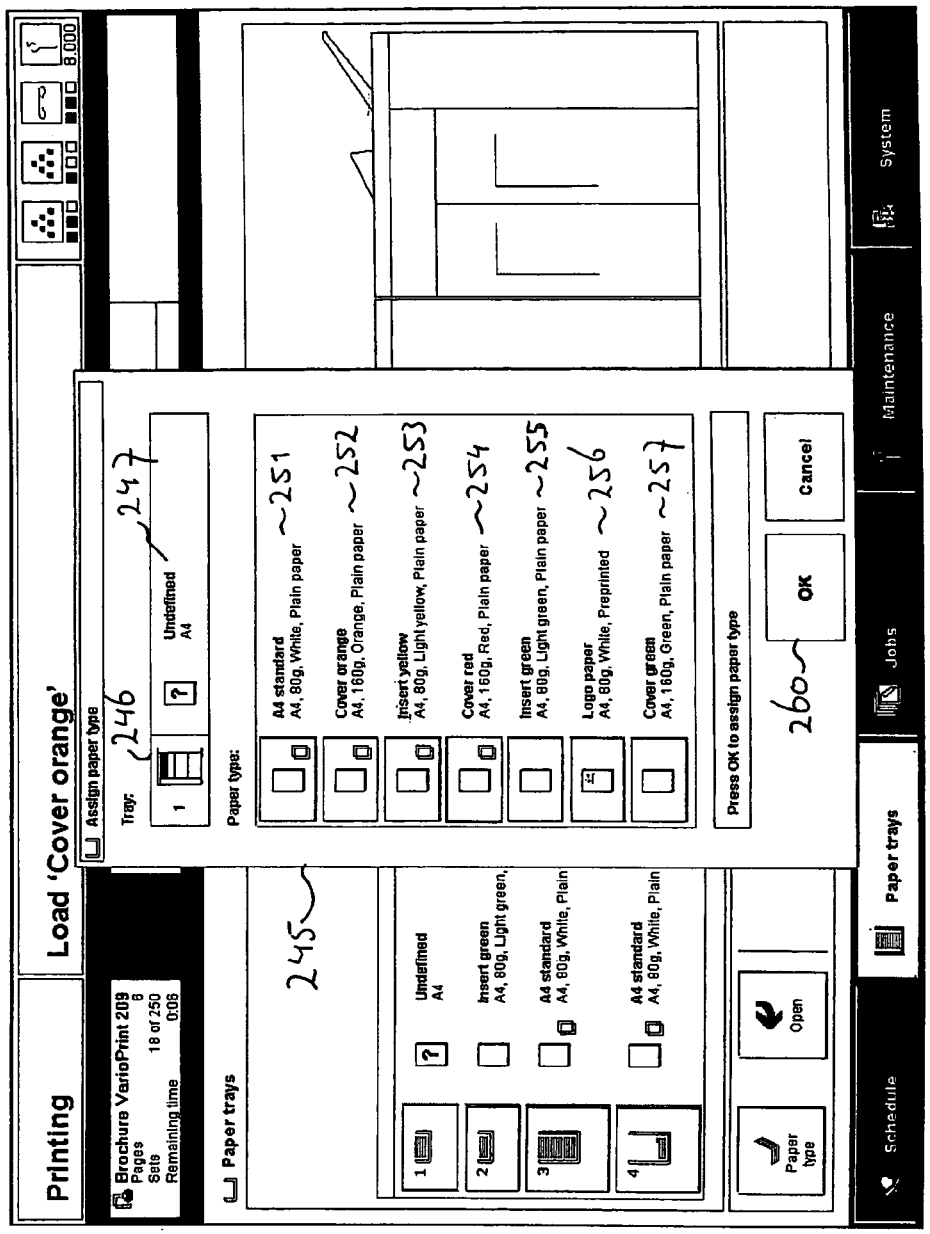
FIG. 6 shows the dialogue window with which an operator can change a paper setting.

The operator selects the paper trays mode by selecting image unit 230. A diagrammatic reproduction 231 of the print engine, the output trays, the screen 19A and the holders 1 to 4 appear on the screen. The same information is given for each of the holders as in the dialogue window 200 in FIG. 4. It is indicated that holder 1 has been selected in this case. For this purpose, thickening 235 is provided at the icon of holder 1. The operator can indicate by actuating image unit 241, that he wants to change the definition of the paper type for this holder. The effect of this is that the definition of this holder as indicated in the figure is changed to "undefined". In addition, a dialogue window 245 will appear on the screen which enables him to set a new definition. This window is shown in FIG. 6. He will then open the holder, for example by actuating an "open" knob on the holder itself, and place the paper according to the new definition in the holder. For this purpose, he will first remove the old paper ("red cover") and then insert the paper according to the new definition ("orange cover").

Another possibility, before he makes the selection to change the paper definition, is to actuate image unit 240 so that holder 1 is opened. The operator, who wants to insert paper of the "orange cover" type in this holder, will now remove the paper that is still in the holder ("red cover") and insert the type of paper he requires. He will then indicate at the holder, for example by pressing a button (not shown), that the inserted paper type ("orange cover") does not correspond to the definition of that holder ("red cover"). After the holder is closed, a dialogue 245 then appears on the screen, with which the operator can change the definition. This dialogue window is shown in FIG. 6. In one embodiment, this window appears automatically in response to the closing of the holder. In another embodiment, the indication that the inserted paper type does not correspond to the definition of the holder only has the effect that the status of that holder is changed to "undefined". This holder can then no longer be addressed by the system to deliver sheets of receiving material until the operator allocates a new definition to the holder.

FIG. 6 shows the dialogue window 245 with which an operator can change or set a paper definition. Calling up this window is coupled to a specific holder, in this case holder 1, indicated by image unit 246. Since the operator previously indicated that the inserted paper (orange covers) does not correspond to the paper definition (was: "red cover") the status of this holder is "undefined". This is indicated in image unit 247.

In the window 245 the operator receives a list of types of receiving materials. This list comprises the receiving materials required to finish the planned jobs as indicated in bar 112 (FIG. 3), namely A4 standard (251), orange covers (252), yellow insert sheets (253) and red covers (254). In addition, the list contains the types of receiving materials as defined for one or more of the holders but which types are not necessary for finishing one of the planned jobs. In this example, only paper of the green insert sheet type (255) comes under this category. The list includes a number of predetermined materials which are frequently required for printing, namely paper provided with a pre-printed logo (256) and green covers (257). The latter predetermined materials can be set by the operator of the system so that they can be adapted to circumstances. Types can be changed or removed and new types can be added to the list.

The operator can now select a type of material as the definition for the holder 1 illustrated. This will normally be the type inserted by him. By actuating button 260 the choice is confirmed and added to the holder as the definition.

Since the operator is presented with a list with types of receiving materials, he does not have to define completely with respect to all of its properties any inserted type of receiving material, but can simply select the inserted type. Since the list takes into account the required paper types for the planned jobs, this list is relatively short and readily surveyed. A choice can then be made quickly and faultlessly.

Figure 7:
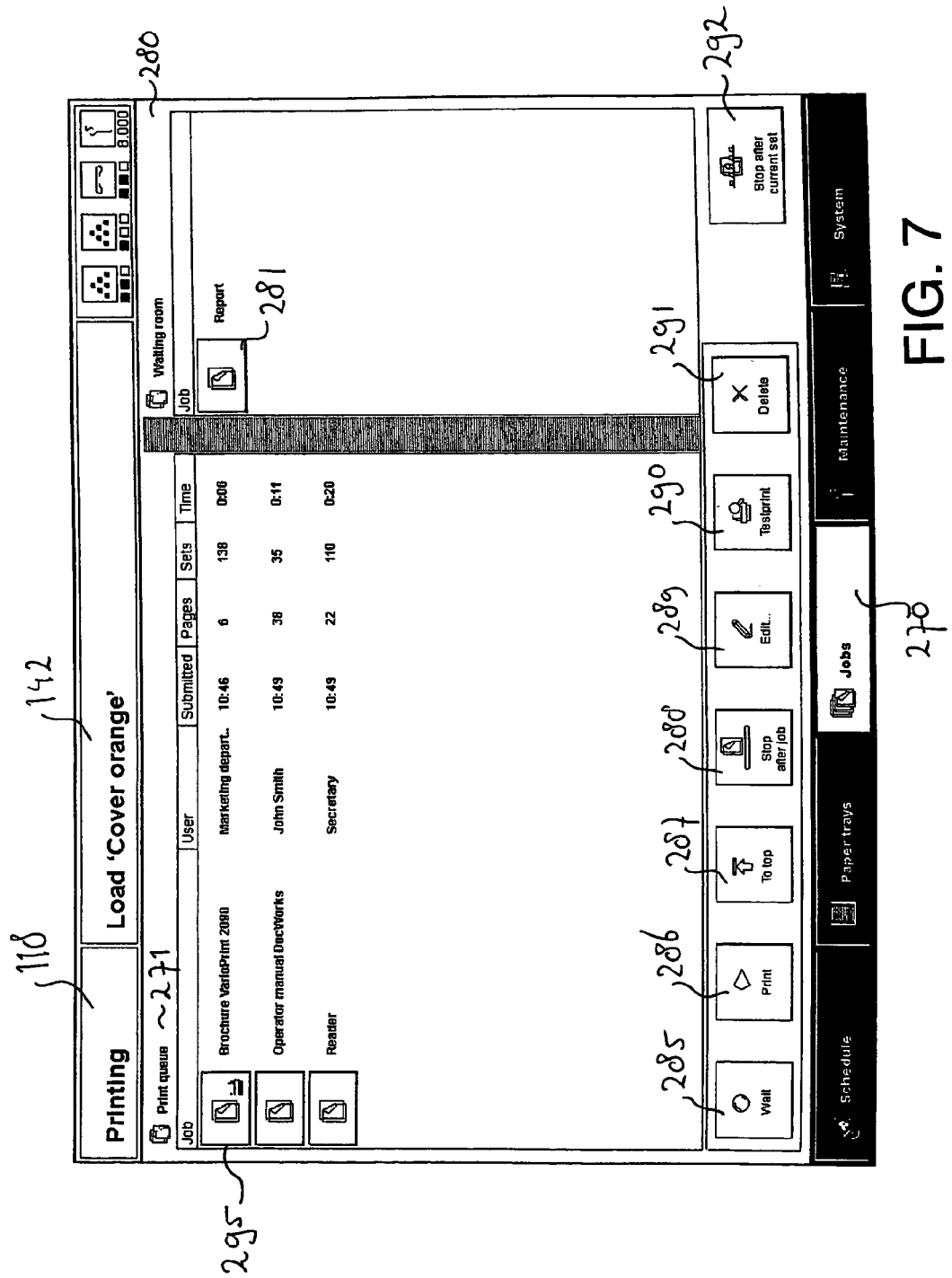
FIG. 7 shows another mode on the display unit.

FIG. 7 shows another mode on the display unit. In this "jobs" mode a survey is given of the jobs which are in the printing queue and are planned for finishing.

The image units 118 and 142 are also displayed in this mode. At the bottom, image unit 270 indicates that the jobs mode has been selected. In this mode, a list of the jobs planned for finishing is given under 271. Since all the jobs are to be finished in the next hour, these are the same jobs as indicated in bar 112 in FIG. 3. An icon is given for each of the job names and from it an operator of the print system can see the status of that job, for example "is now being printed", "is converted to printer language", and so on. Thus icon 295 indicates that this job is being printed at this moment. Each of the job names is followed by additional information as to the origin of the job ("User"), when the job was sent to the system ("Submitted"), how many pages each document of the job contains ("Pages"), how many documents must be printed within the job ("Sets") and what is the expected remaining processing time ("Time"). Under 280 a waiting space is shown in which jobs, in this case one job 281, are located which have been reported to the print system but which are not yet planned for finishing. The removal of this job to the print queue takes place by means of button 286. Relocating a job from the print queue to the waiting space can also be carried out, and for this, button 285 is necessary.

By means of button 287, a job in the print queue can be placed at the head of the queue so that it is finished as the next job. Actuation of button 288 has the effect that the print system stops processing jobs when the selected job is ready. By means of button 289 the settings of jobs in the print queue can be changed. Button 290 enables a proof to be made of the job in the waiting room so that an operator can assess whether the settings are correct for finishing the job or whether they have to be changed. Button 291 is used to remove jobs. Actuation of button 292 ensures that the print system stops processing jobs when the document that it is now involved with is finished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A print system comprising
a print engine for printing a receiving material,
a plurality of holders, each for holding one type of receiving material and delivering said material to the print engine,
a receiver for receiving jobs, a job being an order comprising printing information on one or more types of receiving material specified in said order, and
a control system for planning jobs wherein the jobs are placed in a print queue in a sequence of finishing, the control system also being provided with means for establishing;
   a) the types of receiving material required for printing the respective jobs in the print queue, and
   b) for each type of receiving material a first quantity of receiving material required for printing the respective jobs in the print queue,
   c) for each type of receiving material a second quantity of receiving material being present in the plurality of holders, and
   d) an indication of the time when a type of receiving material will become exhausted in the course of processing the jobs, derived from the establishment of a), b) and c),
wherein the print system further comprises a unit for displaying an image adapted to show the items established under a) and d) by the control system, the image comprising (e) sub-bars, including (1) a sub-bar for showing job names, (2) a sub-bar for showing job time limit indicia, (3) a sub-bar for showing a real-time scale extending across the sub-bar; and (f) an area with a number of columns for displaying receiving media holders and receiving media parameters; and (g) a matrix of rows and columns, each column of the matrix dedicated to a respective job in the print queue, each row of the matrix dedicated to a respective receiving material, and
wherein each column of the matrix has a width corresponding to a duration of the respective job, and each row of the matrix is adapted to display the duration of each job in a sequence of jobs in the print queue dedicated to a respective receiving material using a parameter which indicates the anticipated exhaustion of the respective receiving material for each job in relation to the real-time scale.

2. The print system according to claim 1, wherein the jobs in the print queue comprise jobs which are planned to be finished by the print system within a predetermined period of time.

3. The print system according to claim 1, wherein the image is such that for a displayed type of receiving material an indication is given which corresponds to the quantity of said receiving material required to finish at least a part of the job.

4. The print system according to claim 1, wherein the image is such that as an addition to the types of receiving material which are specified for jobs in the queue, each type of receiving material is displayed which is defined for one or more of the holders but which type is not specified for the jobs in the queue.

5. The print system according to claim 1, wherein the display image is such that in addition to types of receiving material, other job finishing conditions than types of receiving material which are required for finishing jobs are also shown.

6. The print system of claim 1, wherein the parameter is a chromatic color.

7. A method of using a print system containing a print engine for printing a receiving material, a plurality of holders, each for holding a particular type of receiving material and delivering this material to the print engine, a display unit for displaying images and a control system for planning jobs and provided with establishing means, which comprises:
   introducing jobs to the print system, each job being an order including printing information using the print engine on one or more types of receiving material specified in said order,
   placing the jobs in a print queue in a sequence of finishing,
   establishing the types of receiving material required for printing the respective jobs in the print queue;
   establishing for each type of receiving material a first quantity of receiving material required for printing the respective jobs in the print queue;
   establishing for each type of receiving material a second quantity of receiving material being present in the plurality of holders;
   indicating the time when a type of receiving material will become exhausted in the course of processing the jobs,
   displaying an image comprising (a) sub-bars, including (1) a sub-bar for showing job names, (2) a sub-bar for showing job time limit indicia, (3) a sub-bar for showing a real-time scale extending across the sub-bar; and (b) an area with a number of columns for displaying receiving media holders and receiving media parameters; and (c) a matrix of rows and columns, each column of the matrix dedicated to a respective job in the print queue, each row of the matrix dedicated to a respective receiving material, and
wherein each column of the matrix has a width corresponding to a duration of the respective job, and each row of the matrix is adapted to display the duration of each job of a sequence of jobs in the print queue using a parameter which indicates the anticipated exhaustion of the respective receiving material for each job in relation to the real-time scale.

8. The print system of claim 7, wherein the parameter is a chromatic color.

* * * * *